(12) United States Patent
Tokura et al.

(10) Patent No.: US 6,643,451 B1
(45) Date of Patent: Nov. 4, 2003

(54) IMAGE DATA ALTERATION PREVENTING APPARATUS AND ALTERATION PREVENTING METHOD

(75) Inventors: Masanori Tokura, Daito (JP); Shiro Suzuki, Moriguchi (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/274,762

(22) Filed: Mar. 24, 1999

(30) Foreign Application Priority Data

Mar. 25, 1998 (JP) .......................................... 10-077423
Mar. 30, 1998 (JP) .......................................... 10-083137

(51) Int. Cl.[7] .......................... H04N 5/91; H04N 7/167
(52) U.S. Cl. ........................................ 386/94; 380/201
(58) Field of Search ................................ 386/1, 40, 45, 386/94, 124–126; 360/60; 380/201, 203

(56) References Cited

U.S. PATENT DOCUMENTS 5,689,559 A * 11/1997 Park ............................ 380/203
5,991,499 A * 11/1999 Yagasaki et al. ............... 386/94
6,021,199 A * 2/2000 Ishibashi ..................... 380/217
6,061,451 A * 5/2000 Muratani et al. ............. 380/201
6,430,360 B1 * 8/2002 Oh et al. ....................... 386/94

FOREIGN PATENT DOCUMENTS

JP          7-131449          5/1995
JP          7-264546          10/1995

* cited by examiner

Primary Examiner—Thai Tran
Assistant Examiner—Polin Chieu
(74) Attorney, Agent, or Firm—Armstrong, Westerman & Hattori LLP

(57) ABSTRACT

An image data alteration preventing apparatus according to the present invention comprises recording means for producing first alteration detecting data on the basis of image data, to record the produced first alteration detecting data, together with the image data, on a recording medium, and examining means for producing second alteration detecting data on the basis of the image data read out of the recording medium, and collating the produced second alteration detecting data and the first alteration detecting data read out of the recording medium, to judge whether or not the image data read out of the recording medium is altered.

6 Claims, 6 Drawing Sheets

IMAGE DATA ALTERATION PREVENTING APPARATUS AND ALTERATION PREVENTING METHOD

BACKGROUND OF THE INVENTION

1. Field of the Invention

The present invention relates to an image data alteration preventing apparatus, an image data alteration preventing method, a scrambled image producing method, an image reproducing apparatus, and a digital VTR.

2. Description of the Prior Art

[1] A recording apparatus for continuously or intermittently recording an image picked up by a monitoring camera on a video tape by a video tape recorder (VTR) has already been developed.

The contents recorded on the video tape by such a recording apparatus maybe altered. In a case where the contents recorded on the video tape are altered, examination is performed with the truth distorted unless it is recognized that the contents are altered, which may cause social confusion.

An object of the present invention is to provide an alteration preventing apparatus and an alteration preventing method in which it is possible to judge whether or not image data recorded on a recording medium is altered, and prevent the image data from being altered.

[2] A digital VTR for continuously or intermittently recording on a video tape an image picked up by a monitoring camera after coding the image has already been developed.

It is not preferable that the image recorded on the video tape by such a digital VTR is freely reproduced by a person other than a particular person because it is deeply related to privacy.

An object of the present invention is to provide a scrambled image producing method in which a scrambled image can be produced when image coding data obtained by image coding is decoded.

An object of the present invention is to provide an image reproducing apparatus capable of reproducing, when an image is reproduced from a recording medium having image coding data obtained by image coding recorded thereon, a scrambled image.

An object of the present invention is to provide an image reproducing apparatus and a digital VTR which reproduce, when an attempt to reproduce an image is made by a person other than a particular person, a scrambled image.

SUMMARY OF THE INVENTION

An image data alteration preventing apparatus according to the present invention is characterized by comprising recording means for producing first alteration detecting data on the basis of image data, to record the produced first alteration detecting data, together with the image data, on a recording medium, and examining means for producing second alteration detecting data on the basis of the image data read out of the recording medium, and collating the produced second alteration detecting data and the first alteration detecting data read out of the recording medium, to judge whether or not the image data read out of the recording medium is altered. The image data may be digital image data or compressed coding data.

An example of the recording means is one comprising means for blocking in field units the image data such that the width thereof is previously determined n bytes long, means for subjecting image data for each block to a predetermined first operation in the longitudinal direction, to obtain first alteration detecting data which is n bytes long, and means for recording the first alteration detecting data, together with the image data, on the recording medium, and an example of the examining means is one comprising means for blocking in field units the image data read out of the recording medium such that the width thereof is previously determined n bytes long, means for subjecting image data for each block to the first operation in the longitudinal direction, to obtain second alteration detecting data which is n bytes long, and means for collating the obtained second alteration detecting data and the first alteration detecting data read out of the recording medium, to judge whether or not the image data read out of the recording medium is altered.

An example of the recording means is one comprising means for blocking in field units the image data such that the width thereof is previously determined n bytes long, means for subjecting image data for each block to a predetermined first operation in the longitudinal direction, to obtain the result of the operation which is n bytes long, means for subjecting the obtained result of the operation to a predetermined second operation, to obtain first alteration detecting data which is n bytes long, and means for recording the first alteration detecting data, together with the image data, on the recording medium, and an example of the examining means is one comprising means for blocking in field units the image data read out of the recording medium such that the width thereof is previously determined n bytes long, means for subjecting image data for each block to the first operation in the longitudinal direction, to obtain the result of the operation which is n bytes long, means for subjecting the obtained result of the operation to the second operation, to obtain second alteration detecting data which is n bytes long, and means for collating the obtained second alteration detecting data and the first alteration detecting data read out of the recording medium, to judge whether or not the image data read out of the recording medium is altered.

An image data alteration preventing method according to the present invention is characterized by comprising the recording step of producing first alteration detecting data on the basis of image data, to record the produced first alteration detecting data, together with the image data, on a recording medium, and the examining step of producing second alteration detecting data on the basis of the image data read out of the recording medium, and collating the produced second alteration detecting data and the first alteration detecting data read out of the recording medium, to judge whether or not the image data read out of the recording medium is altered. The image data may be digital image data or compressed coding data.

An example of the recording step is one comprising the steps of blocking in field units the image data such that the width thereof is previously determined n bytes long, subjecting image data for each block to a predetermined first operation in the longitudinal direction, to obtain the first alteration detecting data which is n bytes long, and recording the first alteration detecting data, together with the image data, on the recording medium, and an example of the examining step comprises the steps of blocking in field units the image data read out of the recording medium such that the width thereof is previously determined n bytes long, subjecting image data for each block to the first operation in the longitudinal direction, to obtain the second alteration detecting data which is n bytes long, and collating the obtained second alteration detecting data and the first alteration detecting data read out of the recording medium, to judge whether or not the image data read out of the recording medium is altered.

An example of the recording step is one comprising the steps of blocking in field units the image data such that the width thereof is previously determined n bytes long, subjecting image data for each block to a predetermined first operation in the longitudinal direction, to obtain the result of the operation which is n bytes long, subjecting the obtained result of the operation to a predetermined second operation, to obtain first alteration detecting data which is n bytes long, and recording the first alteration detecting data, together with the image data, on the recording medium, and an example of the examining step is one comprising the steps of blocking in field units the image data read out of the recording medium such that the width thereof is previously determined n bytes long, subjecting image data for each block to the first operation in the longitudinal direction, to obtain the result of the operation which is n bytes long, subjecting the obtained result of the operation to the second operation, to obtain second alteration detecting data which is n bytes long, and collating the obtained second alteration detecting data and the first alteration detecting data read out of the recording medium, to judge whether or not the image data read out of the recording medium is altered.

A scrambled image producing method according to the present invention is characterized by comprising the step of performing, when image coding data obtained by image coding is decoded, inverse quantization using a quantization table different from a quantization table used at the time of the image coding, to produce a scrambled image.

A first image reproducing apparatus according to the present invention is an image reproducing apparatus for reproducing an image from a recording medium having image coding data obtained by image coding recorded thereon, characterized by comprising means for switching a normal play mode and a scramble play mode, means for performing, when the image coding data is decoded, inverse quantization using the same quantization table as a quantization table used at the time of the image coding, to reproduce a normal image at the time of normal play mode, and means for performing, when the image coding data is decoded, inverse quantization using a quantization table different from the quantization table used at the time of the image coding, to reproduce a scrambled image at the time of the scramble play mode.

A second image reproducing apparatus according to the present invention is an image reproducing apparatus for reproducing an image from a recording medium having image coding data obtained by image coding recorded thereon, characterized by comprising means for causing an operator to enter a password when a reproduction instruction is entered by the operator, mode switching control means for judging whether or not the password entered by the operator coincides with a password previously registered, to set the operation mode to a normal play mode when both coincide with each other, while setting the operation mode to a scramble play mode when both do not coincide with each other, means for performing, when the image coding data is decoded, inverse quantization using the same quantization table used at the time of the image coding, to reproduce a normal image in a case where the normal play mode is set by the mode switching control means, and means for performing, when the image coding data is decoded, inverse quantization using a quantization table different from the quantization table used at the time of the image coding, to reproduce a scrambled image in a case where the scramble play mode is set by the mode switching control means.

A digital VTR according to the present invention is a digital VTR for coding an image obtained from a monitoring camera, and then recording the coded image on a video tape, and decoding image coding data recorded on the video tape to obtain reproduction data, characterized by comprising means for causing an operator to enter a password when a reproduction instruction is entered by the operator, mode switching control means for judging whether or not the password entered by the operator coincides with a password previously registered, to set the operation mode to a normal play mode when both coincide with each other, while setting the operation mode to a scramble play mode when both do not coincide with each other, means for performing, when the image coding data is decoded, inverse quantization using the same quantization table as a quantization table used at the time of the image coding, to reproduce a normal image in a case where the normal play mode is set by the mode switching control means, and means for performing, when the image coding data is decoded, inverse quantization using a quantization table different from the quantization table used at the time of the image coding, to reproduce a scrambled image in a case where the scramble play mode is set by the mode switching control means.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

[1] Description of First Embodiment

Figure 1:
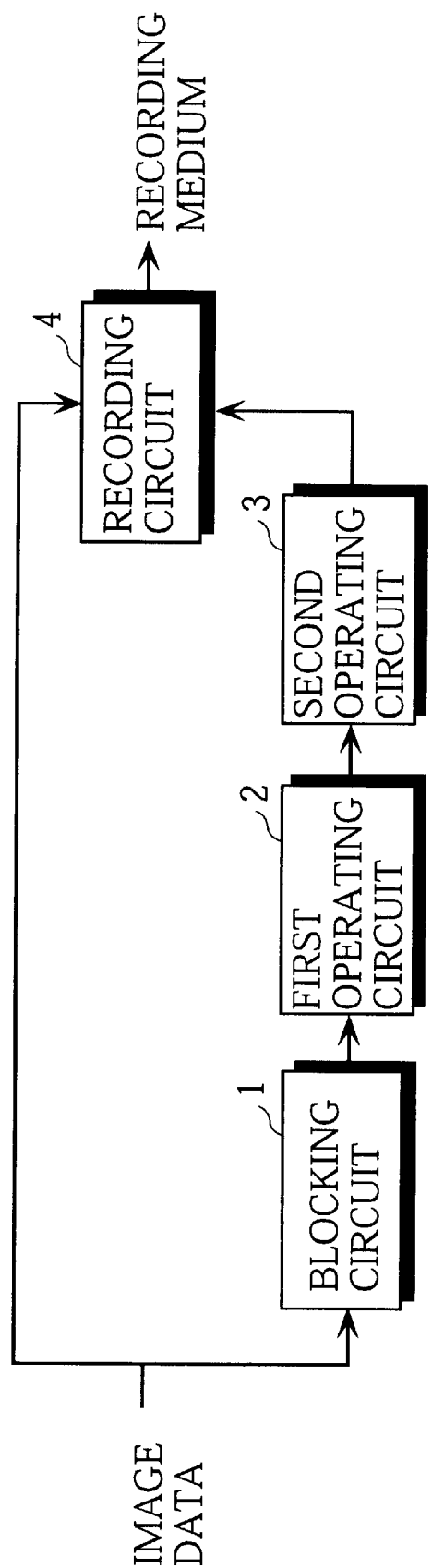
FIG. 1 is a block diagram showing the configuration of a recording device.
Figure 2:
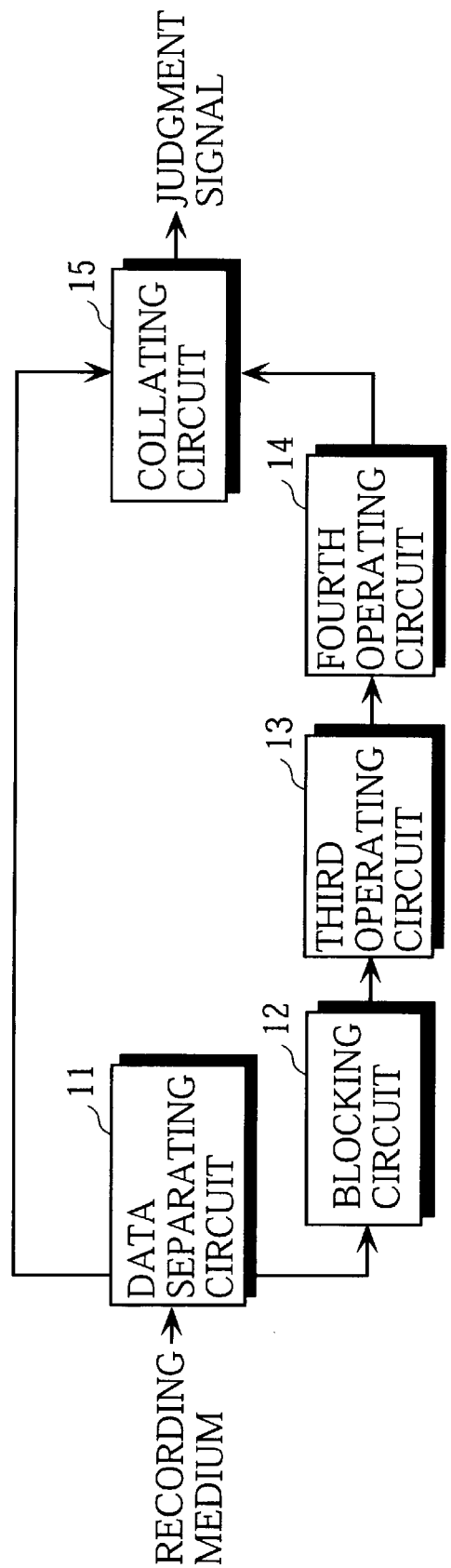
FIG. 2 is a block diagram showing the configuration of an examining device.
Figure 3:
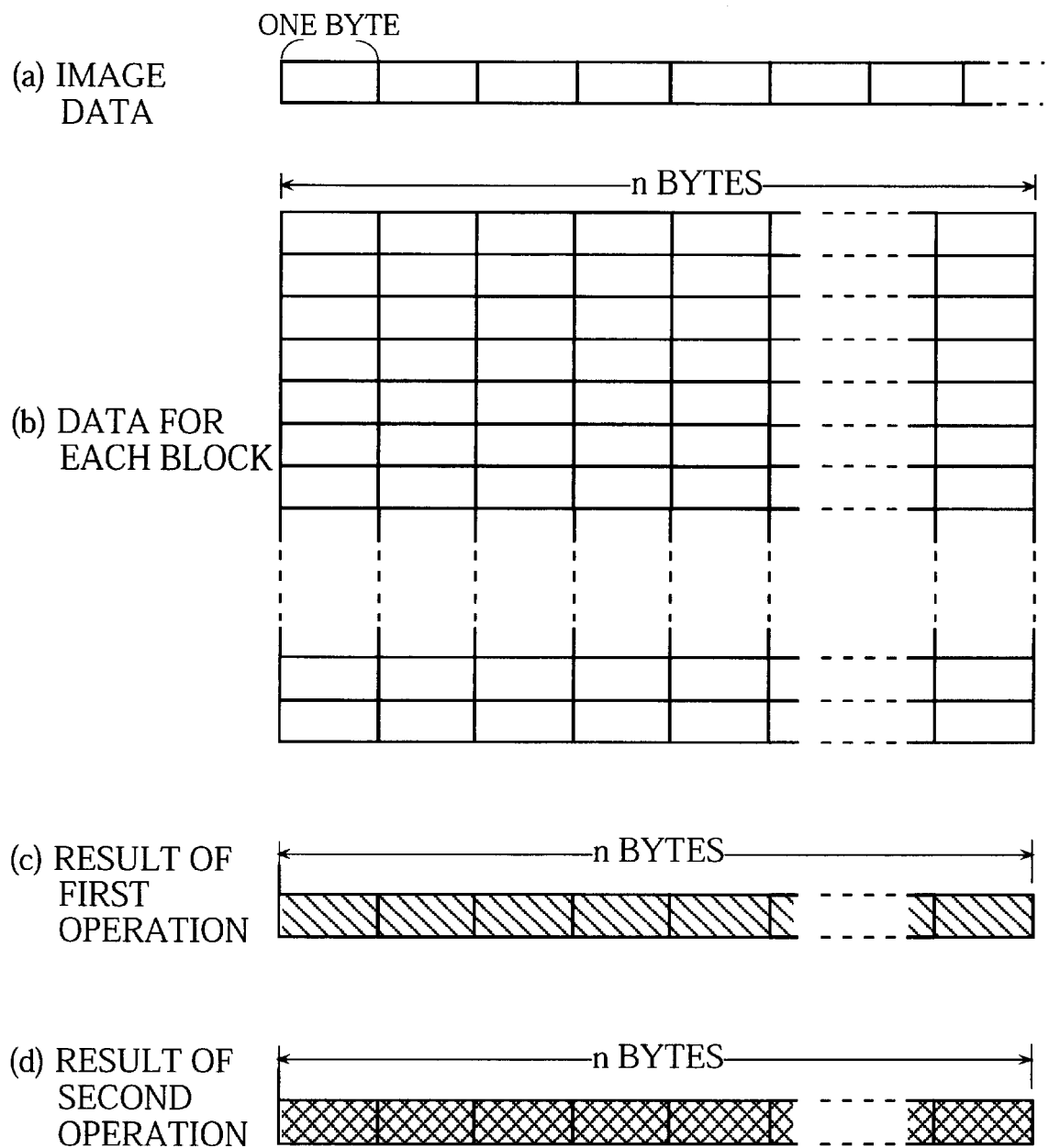
FIGS. 3a to 3d are schematic views for explaining the operations of the recording device.

Referring now to FIGS. 1 to 3, a first embodiment of the present invention will be described.

An image data alteration preventing apparatus comprises a recording device for recording image data on a recording medium, and an examining device for examining whether or not the image data recorded on the recording medium is altered.

FIG. 1 illustrates the configuration of the recording device. In the specification, the image data shall include both digital image data and coding data obtained by compressing the digital image data.

A blocking circuit 1 blocks in field units image data as shown in FIG. 3a such that the width thereof is previously determined n bytes long, as shown in FIG. 3b.

A first operating circuit 2 subjects image data for each block obtained by the blocking circuit 1 to a predetermined first operation in the longitudinal direction, to obtain the result of the first operation which is n bytes long, as shown in FIG. 3c.

Specifically, the first operating circuit 2 carries out for each bit exclusive OR of the image data for each block in the longitudinal direction, for example, to obtain the result of the first operation which is n bytes long. Alternatively, the first operating circuit 2 partitions for each byte length the image data for each block in the transverse direction, and performs for each of sub-blocks obtained by the partitioning an addition operation (where a carry from the most significant bit is ignored) in the longitudinal direction taking one byte as a binary number, to obtain the result of the first operation which is n bytes long.

A second operating circuit 3 subjects the result of the first operation obtained by the first operating circuit 2 to a predetermined second operation, to obtain the result of the second operation which is n bytes long (first alteration detecting data) as shown in FIG. 3d.

Specifically, the second operating circuit 3 generates a 8-bit random number, and carries out for each byte exclusive OR of the result of the first operation and the random number, to obtain the result of the second operation which is n bytes long. Alternately, the second operating circuit 3 generates a 8-bit random number, and performs for each byte an addition operation (where a carry from the most significant bit is ignored) of the result of the first operation and the random number, to obtain the result of the second operation which is n bytes long.

A recording circuit 4 adds in field units the result of the second operation (the first alteration detecting data) to the image data, to record the image data on the recording medium.

FIG. 2 illustrates the configuration of the examining device.

A data separating circuit 11 separates the image data and the first alternation detecting data (the result of the second operation) from reproduction data for each field which has been read out of the recording medium, and respectively feeds the image data and the first alteration detecting data to a blocking circuit 12 and a collating circuit 15.

The blocking circuit 12 blocks in field units the image data which has been fed from the data separating circuit 11 such that the width thereof is previously determined n bytes long.

A third operating circuit 13 subjects the image data for each block obtained by the blocking circuit 12 to the same operation as the above-mentioned first operation in the longitudinal direction, to obtain the result of a third operation which is n bytes long.

A fourth operating circuit 14 subjects the result of the third operation obtained by the third operating circuit 13 to the same operation as the above-mentioned second operation, to obtain the result of a fourth operation (second alteration detecting data) which is n bytes long.

A collating circuit 15 collates the first alteration detecting data (the result of the second operation) which has been fed from the data separating circuit 11 and the second alteration detecting data (the result of the fourth operation) obtained by the fourth operating circuit 14, to output a judgment signal. That is, it outputs a judgment signal indicating that the image data recorded on the recording medium is not altered when the first alteration detecting data and the second alteration detecting data coincide with each other, while outputting a judgment signal indicating that the image data recorded on the recording medium is altered when the first alteration detecting data and the second alteration detecting data do not coincide with each other.

In the recording device, the result of the first operation obtained by the first operating circuit, together with the image data, may be recorded on the recording medium as the first alteration detecting data. In this case, in the examining device, the result of the third operation obtained by the third operating circuit 13 is used as the second alteration detecting data.

According to the first embodiment, it can be judged whether or not the image data recorded on the recording medium is altered. As a result, it is possible to prevent the image data from being altered.

[2] Description of Second Embodiment

Figure 4:
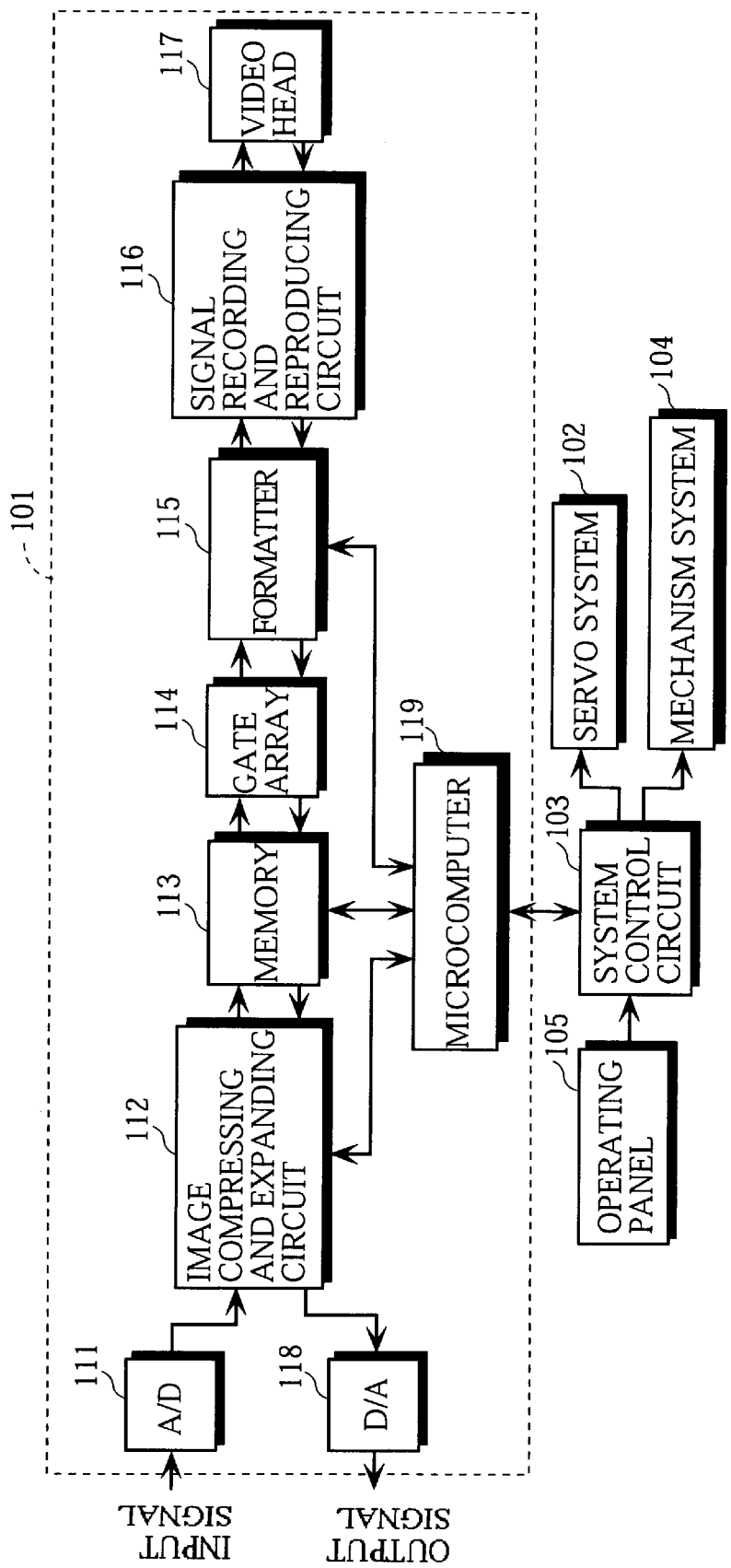
FIG. 4 is a block diagram showing the schematic configuration of a digital VTR.
Figure 5:
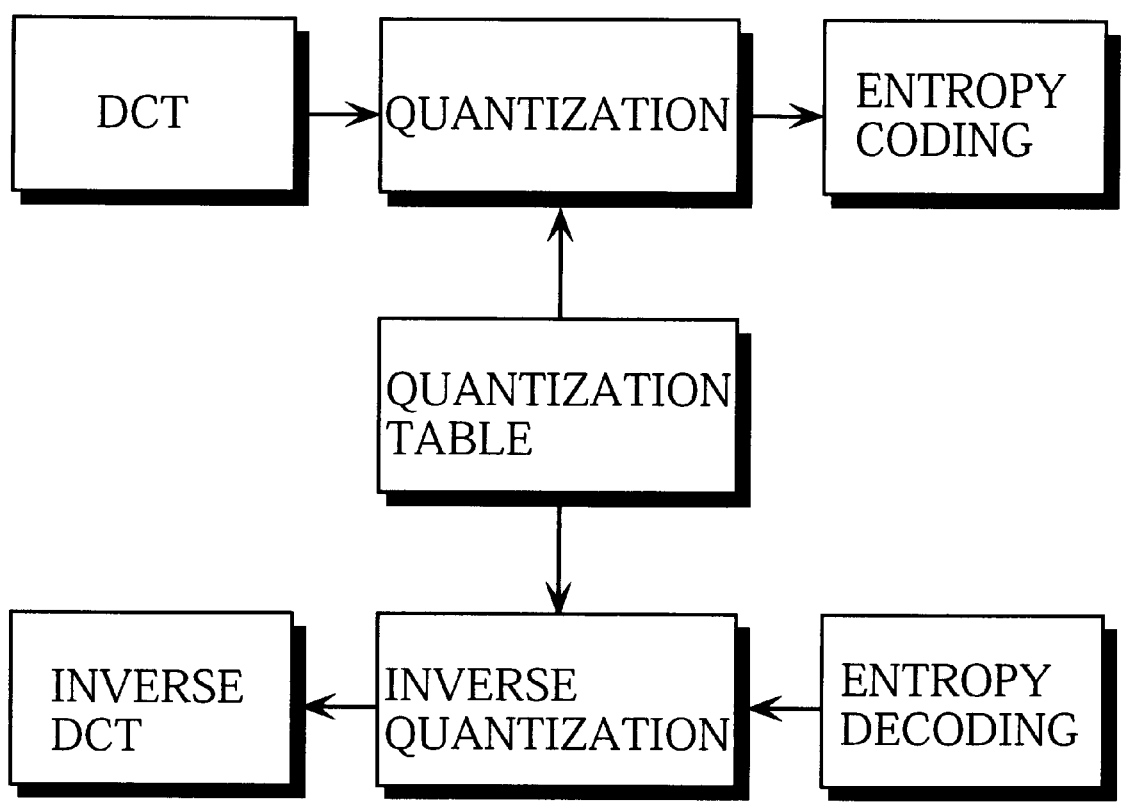
FIG. 5 is a block diagram for explaining the operations of an image compressing and expanding circuit.
Figure 6:
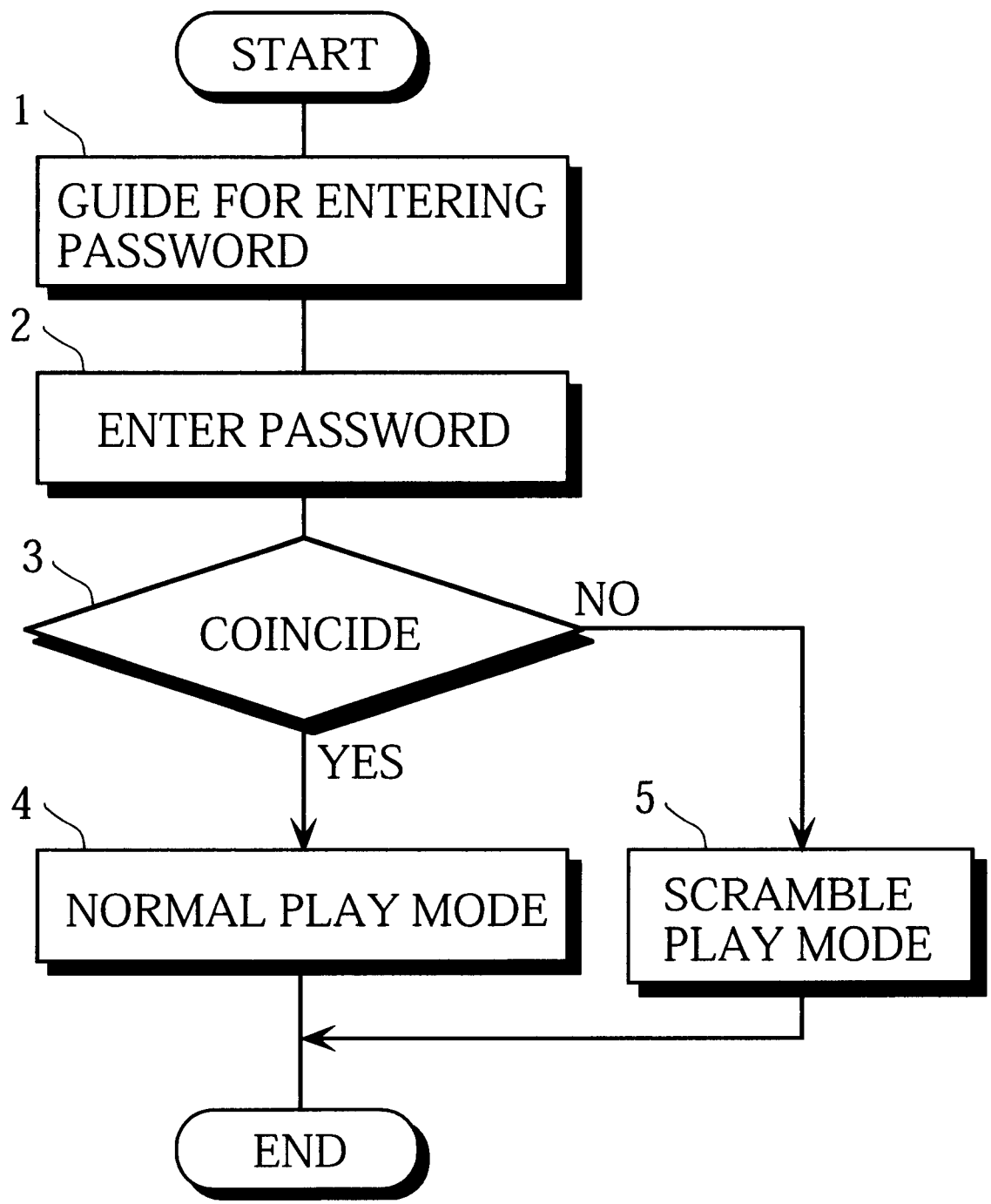
FIG. 6 is a flow chart showing the procedure for operations in a case where a reproduction instruction is entered into a system control circuit by an operator.

Referring now to FIGS. 4 to 6, an embodiment in a case where the present invention is applied to a digital VTR for recording and reproducing an image picked up by a monitoring camera.

FIG. 4 illustrates the configuration of the digital VTR. In FIG. 4, a voice signal processing circuit is omitted.

The digital VTR comprises an image signal processing circuit 101, a servo system (a drum servo system and a capstan servo system) 102, a system control circuit 103, a mechanism system 104, an operation panel 105, and so forth.

The image signal processing circuit 101 comprises an analog-to-digital (A/D) converter 111, an image compressing and expanding circuit 112 for performing image compression and expansion such as JPEG (Joint Photographic Experts Group) or MPEG (Motion Picture Expert Group), a memory 113 for temporarily storing coding data obtained from the image compressing and expanding circuit 112, a gate array 114 such as FPGA (Field Programmable Gate Array), a formatter 115, a signal recording and reproducing unit 116 including a recording amplifier and a reproduction amplifier, a video head 117, a digital-to-analog (D/A) converter 118, and a microcomputer 119 for controlling the image compressing and expanding circuit 112, the memory 113 and the gate array 114.

The image compressing and expanding circuit 112 performs coding and decoding in a JPEG system, for example, which performs DCT (Discrete Cosine Transformation), quantization using a quantization table, and entropy coding at the time of coding, while performing entropy decoding, inverse quantization using a quantization table, and inverse DCT (Inverse Discrete Cosine Transformation) at the time of decoding, as shown in FIG. 5. The microcomputer 119 comprises a normal quantization table (a first quantization table) and a quantization table used for scrambling an image at the time of reproduction (a second quantization table).

Description is made of operations at the time of recording. At the time of recording, an analog video signal fed from a monitoring camera (a video camera) is converted into digital image data by the A/D converter 111. The image data obtained by the A/D converter 111 is compressed by the image compressing and expanding circuit 112, and is converted into coding data. In this case, quantization is performed using the first quantization table. The coding data obtained by the image compressing and expanding circuit 112 is written into the memory 113.

When the coding data is written into the memory 113, header data is added to the coding data for each field by the microcomputer 119 such that a partition between fields are seen.

The coding data which has been written into the memory 113 is read out, and is fed to the gate array 114. In the gate array 114, the coding data which has been fed from the memory 113 is processed into such a shape that it can be inputted to the formatter 115. Data obtained by the gate array 114 is converted into data having a data structure which can be recorded on a video tape by the formatter 115.

The data obtained by the formatter 115 is recorded on the video tape through the recording amplifier in the signal recording and reproducing unit 116 and the video head 117.

Intermittent recording (time-lapse recording) may be performed by not writing into the memory 113 all coding data which have been obtained by the image compressing and expanding circuit 112 but writing the coding data into the memory 113 at a rate of one field per a predetermined number of fields.

Description is made of operations at the time of reproduction.

FIG. 6 shows the procedure for operations in a case where a reproduction instruction is entered into the system control circuit 103 by an operator.

In the digital VTR, a person which is allowed to perform reproduction previously registers a password, and the registered password is stored in a nonvolatile memory provided in the system control circuit 103.

When the reproduction instruction is entered into the system control circuit 103 by the operator, the system control circuit 103 first outputs a guide for urging the operator to enter the password (step 1). Specifically, the guide for urging the operator to enter the password may be outputted by voice, or a guide screen for urging the operator to enter the password may be displayed on a monitor or an operating unit.

Thereafter, when the operator enters the password using the operation panel 105 (step 2), the system control circuit 103 judges whether or not the entered password coincides with a registered password (step 2).

When the password entered by the operator and the registered password coincide with each other, the system control circuit 103 sets the operation mode to a normal play mode (step 4). When the password entered by the operator and the registered password do not coincide with each other, the system control circuit 103 switches the operation mode to a scramble play mode (step 5).

When the normal play mode is set, a drum motor and a capstan motor are driven, so that data is read from the video tape by the video head 117. The data read by the video head 117 is converted into the original coding data through the reproduction amplifier in the signal recording and reproducing unit 116, the formatter 115 and the gate array 114. The coding data obtained by the gate array 114 is fed to the image compressing and expanding circuit 112 through the memory 113, and is expanded. In this case, inverse quantization is performed using the first quantization table. Digital image data obtained by the image compressing and expanding circuit 112 is returned to an analog video signal by the DA converter 118, and is then fed to a monitor (not shown) and is displayed thereon. In this case, an image recorded on the video tape is normally reproduced.

When the scramble play mode is set, data is read from the video tape by the video head 117, and the read data is converted into the original coding data through the reproduction amplifier in the signal recording and reproducing unit 116, the formatter 115 and the gate array 114. The coding data obtained by the gate array 114 is fed to the image compressing and expanding circuit 112 through the memory 113. In this case, inverse quantization is performed using the second quantization table. Digital image data obtained by the image compressing and expanding circuit 112 is returned to an analog video signal by the D/A converter 118, and is then fed to a monitor (not shown) and is displayed thereon. In this case, inverse quantization is performed using the second quantization table. Therefore, an image recorded on the video tape is not normally reproduced. That is, the image displayed on the monitor is a scrambled image.

The present invention is also applicable to a video disk player, and so forth in addition to the digital VTR.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data alteration preventing apparatus comprising:

recording means for producing first alteration detecting data on the basis of image data, to record the produced first alteration detecting data, together with the image data, on a recording medium; and examining means for producing second alteration detecting data on the basis of the image data read out of the recording medium, and collating the produced second alteration detecting data and the first alteration detecting data read out of the recording medium, to judge whether or not the image data read out of the recording medium is altered.

2. An image data alteration preventing apparatus comprising:

recording means for producing first alteration detecting data on the basis of image data, to record the produced first alteration detecting data, together with the image data, on a recording medium; and examining means for producing second alteration detecting data on the basis of the image data read out of the recording medium, and collating the produced second alteration detecting data and the first alteration detecting data read out of the recording medium, to judge whether or not the image data read out of the recording medium is altered, wherein the recording means comprises means for blocking in field units the image data such that the width thereof is previously determined n bytes long, means for subjecting image data for each block to a predetermined first operation in the longitudinal direction, to obtain first alteration detecting data which is n bytes long, and means for recording the first alteration detecting data, together with the image data, on the recording medium, and the examining means comprises means for blocking in field units the image data read out of the recording medium such that the width thereof is previously determined n bytes long, means for subjecting image data for each block to said first operation in the longitudinal direction, to obtain second alteration detecting data which is n bytes long, and means for collating the obtained second alteration detecting data and the first alteration detecting data read out of the recording medium, to judge whether or not the image data read out of the recording medium is altered.

3. An image data alteration preventing apparatus comprising:

recording means for producing first alteration detecting data on the basis of image data, to record the produced first alteration detecting data, together with the image data, on a recording medium; and examining means for producing second alteration detecting data on the basis of the image data read out of the recording medium, and collating the produced second alteration detecting data and the first alteration detecting data read out of the recording medium, to judge whether or not the image data read out of the recording medium is altered, wherein the recording means comprises
means for blocking in field units the image data such that the width thereof is previously determined n bytes long,
means for subjecting image data for each block to a predetermined first operation in the longitudinal direction, to obtain the result of the operation which is n bytes long,
means for subjecting the obtained result of the operation to a predetermined second operation, to obtain first alteration detecting data which is n bytes long, and
means for recording the first alteration detecting data, together with the image data, on the recording medium, and the examining means comprises
means for blocking in field units the image data read out of the recording medium such that the width thereof is previously determined n bytes long,
means for subjecting image data for each block to said first operation in the longitudinal direction, to obtain the result of the operation which is n bytes long,
means for subjecting the obtained result of the operation to said second operation, to obtain second alteration detecting data which is n bytes long, and
means for collating the obtained second alteration detecting data and the first alteration detecting data read out of the recording medium, to judge whether or not the image data read out of the recording medium is altered.

4. An image data alteration preventing method comprising:

the recording step of producing first alteration detecting data on the basis of image data, to record the produced first alteration detecting data, together with the image data, on a recording medium; and the examining step of producing second alteration detecting data on the basis of the image data read out of the recording medium, and collating the produced second alteration detecting data and the first alteration detecting data read out of the recording medium, to judge whether or not the image data read out of the recording medium is altered.

5. An image data alteration preventing method comprising:

the recording step of producing first alteration detecting data on the basis of image data, to record the produced first alteration detecting data, together with the image data, on a recording medium; and the examining step of producing second alteration detecting data on the basis of the image data read out of the recording medium, and collating the produced second alteration detecting data and the first alteration detecting data read out of the recording medium, to judge whether or not the image data read out of the recording medium is altered, wherein the recording step comprises the steps of
blocking in field units the image data such that the width thereof is previously determined n bytes long,
subjecting image data for each block to a predetermined first operation in the longitudinal direction, to obtain the first alteration detecting data which is n bytes long, and
recording the first alteration detecting data, together with the image data, on the recording medium, and
the examining step comprises the steps of
blocking in field units the image data read out of the recording medium such that the width thereof is previously determined n bytes long,
subjecting image data for each block to said first operation in the longitudinal direction, to obtain the second alteration detecting data which is n bytes long, and
collating the obtained second alteration detecting data and the first alteration detecting data read out of the recording medium, to judge whether or not the image data read out of the recording medium is altered.

6. An image data alteration preventing method comprising:

the recording step of producing first alteration detecting data on the basis of image data, to record the produced first alteration detecting data, together with the image data, on a recording medium; and the examining step of producing second alteration detecting data on the basis of the image data read out of the recording medium, and collating the produced second alteration detecting data and the first alteration detecting data read out of the recording medium, to judge whether or not the image data read out of the recording medium is altered, wherein the recording step comprises the steps of
blocking in field units the image data such that the width thereof is previously determined n bytes long,
subjecting image data for each block to a predetermined first operation in the longitudinal direction, to obtain the result of the operation which is n bytes long,
subjecting the obtained result of the operation to a predetermined second operation, to obtain first alteration detecting data which is n bytes long, and
recording the first alteration detecting data, together with the image data, on the recording medium, and
the examining step comprises the steps of
blocking in field units the image data read out of the recording medium such that the width thereof is previously determined n bytes long,
subjecting image data for each block to said first operation in the longitudinal direction, to obtain the result of the operation which is n bytes long, and
subjecting the obtained result of the operation to said second operation, to obtain second alteration detecting data which is n bytes long, and
collating the obtained second alteration detecting data and the first alteration detecting data read out of the recording medium, to judge whether or not the image data read out of the recording medium is altered.

* * * * *